US009547217B2

(12) United States Patent
Iwasaki

(10) Patent No.: US 9,547,217 B2
(45) Date of Patent: Jan. 17, 2017

(54) DEVICE AND, METHOD FOR CONTROLLING A FOCUSING OPERATION

(71) Applicant: FUJIFILM Corporation, Tokyo (JP)

(72) Inventor: Yoichi Iwasaki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/718,971

(22) Filed: May 21, 2015

(65) Prior Publication Data

US 2015/0253648 A1    Sep. 10, 2015

Related U.S. Application Data

(63) Continuation of application No. PCT/JP2013/074708, filed on Sep. 12, 2013.

(30) Foreign Application Priority Data

Nov. 22, 2012  (JP) ................... 2012-256350

(51) Int. Cl.
G03B 13/36     (2006.01)
G02B 7/34      (2006.01)
(Continued)

(52) U.S. Cl.
CPC ............... G03B 13/36 (2013.01); G02B 7/34 (2013.01); H04N 5/2353 (2013.01);
(Continued)

(58) Field of Classification Search
CPC .... G03B 13/36; H04N 5/2353; H04N 5/3696; H04N 5/374; H04N 5/372; H04N 5/23212; G02B 7/34
See application file for complete search history.

(56) References Cited

U.S. PATENT DOCUMENTS 5,600,398 A      2/1997  Ogasawara
2008/0259202 A1* 10/2008 Fujii ................. H04N 5/23212
                                                 348/345

FOREIGN PATENT DOCUMENTS

JP    2-15225 A    1/1990
JP    5-27157 A    2/1993
(Continued)

OTHER PUBLICATIONS

International Search Report issued in PCT/JP2013/074708, mailed on Sep. 12, 2013.
(Continued)

Primary Examiner — Twyler Haskins
Assistant Examiner — Angel L Garces-Rivera
(74) Attorney, Agent, or Firm — Birch, Stewart, Kolasch & Birch, LLP

(57) ABSTRACT

An imaging device, includes: an imaging element including imaging pixels and phase difference detecting pixels, a calculating unit which calculates numerical information corresponding to a defocus amount using an image signal obtained by imaging by the phase difference detecting pixels whenever the imaging is performed by the imaging element, a difference calculating unit calculating with respect to at least three times of imaging which is continuously performed, a difference between the numerical information obtained by arbitrary imaging and the numerical information obtained by the imaging which is continuously performed after the arbitrary imaging, and a control unit which moves a focus lens to a focus position using the obtained numerical information when a variance of the obtained differences is smaller than a threshold value and controls a position of the focus lens not to be changed when the variance is equal to or larger than the threshold value.

6 Claims, 7 Drawing Sheets

(51) Int. Cl.
*H04N 5/232* (2006.01)
*H04N 5/235* (2006.01)
*H04N 5/369* (2011.01)
*H04N 5/372* (2011.01)
*H04N 5/374* (2011.01)

(52) U.S. Cl.
CPC ....... *H04N 5/23212* (2013.01); *H04N 5/3696* (2013.01); *H04N 5/372* (2013.01); *H04N 5/374* (2013.01)

(56) References Cited

FOREIGN PATENT DOCUMENTS

| JP | 7-318783 A | 12/1995 |
|---|---|---|
| JP | 8-146286 A | 6/1996 |
| JP | 10-10416 A | 1/1998 |
| JP | 2004-85843 A | 3/2004 |
| JP | 2008-187231 A | 8/2008 |
| JP | 2012-133172 A | 7/2012 |

OTHER PUBLICATIONS

PCT/IPEA/409—Issued in PCT/JP2013/074708 dated Mar. 17, 2015.
PCT/ISA/237—Issued in PCT/JP2013/074708, mailed on Sep. 12, 2013.

\* cited by examiner

DEVICE AND, METHOD FOR CONTROLLING A FOCUSING OPERATION

CROSS REFERENCE TO RELATED APPLICATION

This is a continuation of International Application No. PCT/JP2013/074708 filed on Sep. 12, 2013, and claims priority from Japanese Patent Application No. 2012-256350, filed on Nov. 22, 2012, the entire disclosures of which are incorporated herein by reference.

BACKGROUND

1. Technical Field

The present invention relates to an imaging device which focuses a subject by a phase difference AF method, a focusing method thereof, and a non-transitory computer readable medium storing a focusing control program.

2. Related Art

An auto focus (AF) system, which is mounted in an imaging device such as a digital still camera, mainly includes two systems, which are a phase difference AF system and a contrast AF system. Between the two systems, the phase difference AF system has an advantage of having a high focusing speed, so as to be generally employed to a single lens reflex camera.

However, when a distance to a major subject is measured by the phase AF system several times and a focusing operation of a focus lens is performed using the measurement results after several attempts, the measurement results may not be consistent. Further, when camera panning is performed, a distance to a major subject is suddenly changed. Also in this case, when the focusing operation of the focus lens is performed based on the measurement result of the phase difference AF system, movement of the focus lens is too quick, so that the focusing operation is inappropriate and a defocused image may be captured.

Therefore, in the related art disclosed in Patent Literature 1 (JP-A-H08-146286), the focusing operation is performed using an average of a predetermined number of measurement results. When the measurement result is inconsistently changed, the focusing operation is performed excluding the inconsistent measurement results.

In the related art disclosed in Patent Literature 2 (JP-A-H05-27157), four measurement results immediately before photographing are averaged to be used for the focusing operation and when the measurement results are continuously and significantly changed, an auto-focus operation does not performed.

In the related art disclosed in Patent Literature 3 (JP-A-H02-15225), when the measurement result is significantly changed, it is determined that the change is caused by camera panning, so that the auto-focus operation cannot be enabled.

SUMMARY OF INVENTION

When the subject is focused to be photographed by a phase difference AF method, there is no problem if a major subject stops. However, when the major subject is a moving object or the camera panning is performed so that the major subject relatively moves with respect to the camera, it is difficult to photograph an image which is focused on the major subject.

Like the related art, the plurality of measurement results is averaged or a following operation of the auto-focus stops when the measurement result is significantly changed, so that it is possible to avoid photographing the defocused image to some degree.

However, a criteria of determining when the focusing operation is performed using the average of the measurement results or when the following operation of the auto-focus stops is not clear, so that in some cases, an image which is significantly defocused is photographed.

In view of above, an object of the present invention is to perform a focusing operation by a phase difference AF method or stop the focusing operation using new and appropriate determining criteria.

An aspect of the present invention provides an imaging device, comprising an imaging element which images a subject by an imaging optical system including a focus lens, wherein the imaging element includes a plurality of imaging pixels and a plurality of phase difference detecting pixels which receives luminous fluxes which have passed through different parts of a pupil area of the imaging optical system; a calculating unit which calculates numerical information corresponding to a defocus amount using an image signal obtained by imaging by the plurality of phase difference detecting pixels whenever the imaging is performed by the imaging element; a difference calculating unit which calculates with respect to at least three times of imaging which is continuously performed, a difference between the numerical information obtained by arbitrary imaging of the at least three times of imaging and the numerical information obtained by the imaging which is continuously performed after the arbitrary imaging; and a control unit which moves the focus lens to a focus position using the numerical information obtained by the calculating unit when a variance of the plurality of differences obtained by the difference calculating unit is smaller than a threshold value and controls a position of the focus lens not to be changed when the variance is equal to or larger than the threshold value.

Another aspect of the present invention provides a focus control method of an imaging device including an imaging element which images a subject by an imaging optical system including a focus lens, wherein the imaging element includes a plurality of imaging pixels and a plurality of phase difference detecting pixels which receives luminous fluxes which have passed through different parts of a pupil area of the imaging optical system, the method comprises: a calculating step which calculates numerical information corresponding to a defocus amount using an image signal obtained by imaging by the plurality of phase difference detecting pixels whenever the imaging is performed by the imaging element; a difference calculating step which calculates with respect to at least three times of imaging which is continuously performed, a difference between the numerical information obtained by arbitrary imaging of the at least three times of imaging and the numerical information obtained by the imaging which is performed after the arbitrary imaging; and a control step which moves the focus lens to a focus position using the numerical information obtained in the calculating step when a variance of the plurality of differences obtained in the difference calculating step is smaller than a threshold value and controls a position of the focus lens not to be changed when the variance is equal to or larger than the threshold value.

Another aspect of the present invention provides a non-transitory computer readable medium storing a program causing a computer to execute a process for controlling a focus of a focus lens of an imaging device including an imaging element which images a subject by an imaging optical system including the focus lens, wherein the imaging element includes an imaging pixel and a plurality of phase difference detecting pixels which receives luminous fluxes which have passed through different parts of a pupil area of the imaging optical system, and the process comprises: a calculating step which calculates numerical information corresponding to a defocus amount using an image signal obtained by imaging by the plurality of phase difference detecting pixels whenever the imaging is performed by the imaging element; a difference calculating step which calculates with respect to at least three times of imaging which is continuously performed, a difference between the numerical information obtained by arbitrary imaging of the at least three times of imaging and the numerical information obtained by the imaging which is performed after the arbitrary imaging; and a control step which moves the focus lens to a focus position using the numerical information obtained in the calculating step when a variance of the plurality of differences obtained in the difference calculating step is smaller than a threshold value and controls a position of the focus lens not to be changed when the variance is equal to or larger than the threshold value.

Any one of the aspects of the present invention performs a focusing operation by a phase difference AF method or stops the focusing operation using new and appropriate determining criteria.

DESCRIPTION OF EMBODIMENTS

Hereinafter, one embodiment of the present invention will be described with reference to drawings.

Figure 1:
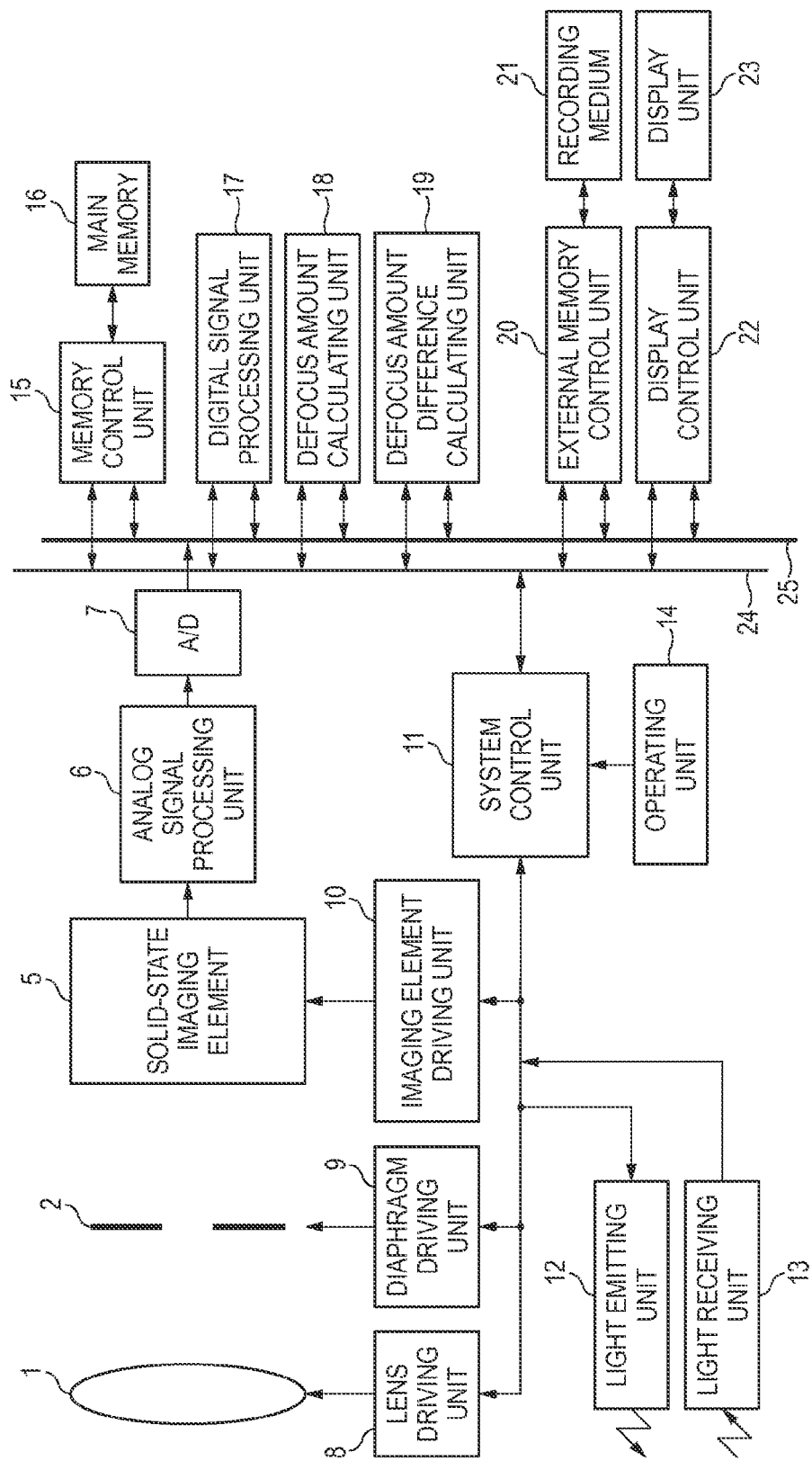
FIG. 1 is a functional block diagram of an imaging device according to an embodiment of the present invention.

FIG. 1 is a diagram illustrating a schematic configuration of a digital camera as an example of an imaging device for explaining an embodiment of the present invention. An imaging system of a digital camera illustrated in FIG. 1 includes a lens device (including a photographing lens 1 and a diaphragm 2) as an imaging optical system and a CCD or CMOS solid-state imaging element 5 which images a subject through the lens device. The lens device which includes the photographing lens 1 and the diaphragm 2 is attachable or fixed to a camera main body.

A system control unit 11 which collectively controls an entire electrical control system of the digital camera controls a flash light emitting unit 12 and a light receiving unit 13. Further, the system control unit 11 controls a lens driving unit 8 to adjust a position of a focus lens which is included in the photographing lens 1 or a position of a zoom lens which is included in the photographing lens 1. Moreover, the system control unit 11 controls an aperture size of the diaphragm 2 through a diaphragm driving unit 9 so as to adjust an exposure amount.

The system control unit 11 drives the solid-state imaging element 5 through an imaging element driving unit 10 to output a subject image captured through the photographing lens 1 as a captured image signal. An instruction signal from a user is input to the system control unit 11 through an operating unit 14.

The electrical control system of the digital camera further includes an analog signal processing unit 6 connected to an output of the solid-state imaging element 5 to perform an analog signal processing such as a correlated double sampling processing and an A/D converting circuit 7 which converts an analog signal output from the analog signal processing unit 6 into a digital signal. The analog signal processing unit 6 and the A/D converting circuit 7 are controlled by the system control unit 11. The analog signal processing unit 6 and the A/D converting circuit 7 are embedded in the solid-state imaging element 5 in some cases.

The electrical control system of the digital camera includes a main memory 16, a memory control unit 15 which is connected to the main memory 16, a digital signal processing unit 17 which performs an interpolation operation, a gamma correction operation, and an RGB/YC conversion processing on a captured image signal output from the A/D converting circuit 7 to generate photographed image data, a defocus amount calculating unit 18 which calculates a defocus amount using a part of the captured image signal output from the solid-state imaging element 5, a defocus amount difference calculating unit 19 which calculates a difference between two defocus amounts calculated by the defocus amount calculating unit 18, an external memory control unit 20 to which a detachable recording medium 21 is connected, and a display control unit 22 to which a display unit 23 mounted on a rear surface of a camera is connected.

The memory control unit 15, the digital signal processing unit 17, the defocus amount calculating unit 18, the defocus amount difference calculating unit 19, the external memory control unit 20, and the display control unit 22 are connected to each other by a control bus 24 and a data bus 25 to be controlled by an instruction from the system control unit 11.

Figure 2:
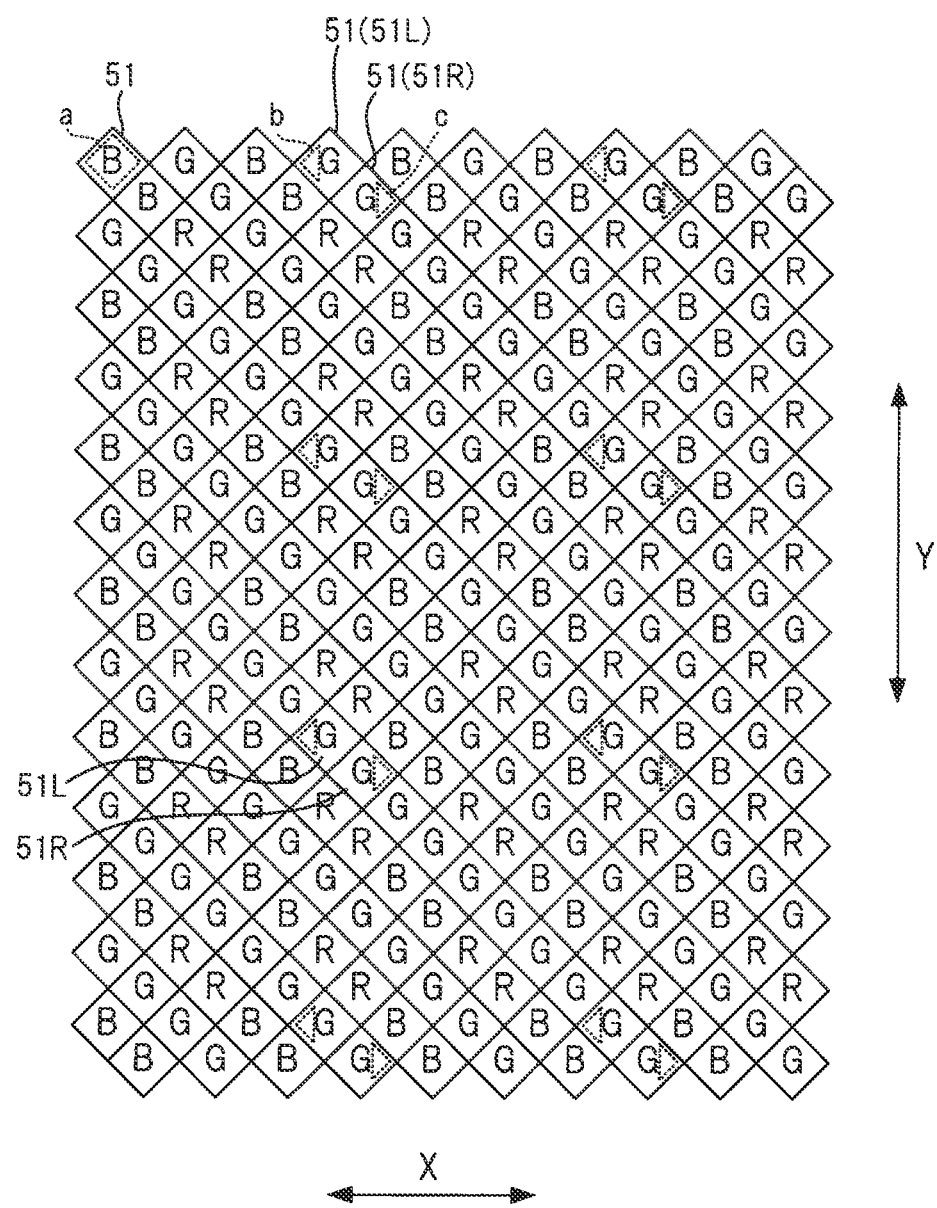
FIG. 2 is a plan view of major components on a light receiving surface of a solid-state imaging element illustrated in FIG. 1.

FIG. 2 is a partial enlarged view illustrating a plane configuration of the solid-state imaging element 5 which is mounted in the digital camera illustrated in FIG. 1.

The solid-state imaging element 5 includes a plurality of pixels 51 (square blocks in the drawing) which is two-dimensionally arranged in a row direction X and a column direction Y, which is perpendicular to the row direction X. Even though all pixels 51 are not illustrated in FIG. 2, actually, millions to tens of millions of pixels 51 are two-dimensionally arranged. When an image is captured by the solid-state imaging element 5, output signals from the plurality of pixels 51 are individually obtained.

Each pixel 51 includes a photoelectric converting unit such as a photo diode and a color filter which is formed above the photoelectric converting unit.

In FIG. 2, a pixel 51 including a color filter through which a red light component is transmitted is denoted by a reference character R, a pixel 51 including a color filter through which a green light component is transmitted is denoted by a reference character "G", and a pixel 51 including a color filter through which a blue light component is transmitted is denoted by a reference character "B".

An arrangement of the plurality of pixels 51 is configured such that a plurality of pixel rows including a plurality of pixels 51 which is lined up in a row direction X is lined up in a column direction Y. Odd numbered pixel rows and even numbered pixel rows are off-centered by approximately a half of an arrangement pitch of the pixels 51 of each pixel row in the row direction X.

The arrangement of the color filters which are included in each pixel 51 of an odd-numbered pixel row is entirely a Bayer arrangement. Further, the arrangement of the color filters which are included in respective pixels 51 of an even-numbered pixel row is also entirely a Bayer arrangement. A pixel 51 in the odd-numbered row and a pixel 51 which detects the same color light component as that of the pixel 51 and is adjacent to the pixel 51 at a lower right side form a pair pixel.

According to the solid-state imaging element 5 with a pixel arrangement described above, output signals of two pixels 51 which configure the pair pixel are added, thereby achieving high sensitivity of the camera. Further, a wide dynamic ranged camera may be obtained by varying exposure times of two pixels 51 which configure the pair pixel and adding the output signals of the two pixels 51.

In the solid-state imaging element 5, a part of a plurality of pair pixels serves as a pair (hereinafter, referred to as a phase difference pair) of phase difference detecting pixels (focus detecting pixels). Each phase difference pair is configured by a phase difference detecting pixel 51R and a phase difference detecting pixel 51L which are adjacent in a diagonal direction in an example of FIG. 2.

The phase difference detecting pixel 51R receives one (for example, a luminous flux which has passed through a right half of the pupil area) of a pair of luminous fluxes which have passed through different parts of a pupil area of the photographing lens 1 and outputs a signal in accordance with an amount of received light. That is, the phase difference detecting pixel 51R provided in the solid-state imaging element 5 captures an image formed by one of the pair of luminous fluxes which have passed through different parts of the pupil area of the photographing lens 1.

Another phase difference detecting pixel 51L which forms the pair together with the phase difference detecting pixel 51R receives the other one (for example, a luminous flux which has passed through a left half of the pupil area) of the pair of luminous fluxes and outputs a signal in accordance with an amount of received light. That is, the phase difference detecting pixel 51L provided in the solid-state imaging element 5 captures an image formed by the other one of the pair of luminous fluxes which have passed through different parts of the pupil area of the photographing lens 1.

In the meantime, a plurality of pixels 51 (hereinafter, referred to as imaging pixels) other than the phase difference detecting pixels 51R and 51L captures an image formed by a luminous flux which passes through almost all parts of the pupil area of the photographing lens 1.

A light shielding layer is provided above the photoelectric converting unit of the pixel 51 and an aperture which defines a light receiving area of the photoelectric converting unit is formed in the light shielding layer. A center of the aperture (denoted by reference character "a" in FIG. 2) of the imaging pixel 51 coincides with a center (a center of a square block) of the photoelectric converting unit of the imaging pixel 51. In the meantime, in FIG. 2, in order to simplify the drawing, the aperture a is illustrated only in one of the imaging pixels 51.

To the contrary, a center of an aperture (denoted by reference character "c" in FIG. 2) of the phase difference detecting pixel 51R is off-centered to the right with respect to the center of the photoelectric converting unit of the phase difference detecting pixel 51R. A center of an aperture (denoted by reference character "b" in FIG. 2) of the phase difference detecting pixel 51L is off-centered to the left with respect to the center of the photoelectric converting unit of the phase difference detecting pixel 51L.

In the solid-state imaging element 5, a part of the pixels 51 on which a green color filter is mounted serves as the phase difference detecting pixels 51R or the phase difference detecting pixels 51L. Of course, a pixel on which color filter having another color is mounted may serve as the phase difference detecting pixel.

In the illustrated example, the phase difference detecting pixel 51R and the phase difference detecting pixel 51L are discretely and periodically arranged in a region where the pixels 51 are disposed.

The phase difference detecting pixels 51R are disposed with an interval of three pixels in the row direction X in a part (four pixel rows which are lined up with an interval of three pixel rows in the example of FIG. 2) of the even-numbered pixel rows, in the example of FIG. 2. In the example of FIG. 2, the phase difference detecting pixels 51L are disposed with the same cycle as the phase difference detecting pixels 51R in the row direction X in the part to pixel row next to the pixel row including the phase difference detecting pixel 51R) of the odd-numbered pixel rows.

With this configuration, among light components which pass through the aperture "b" of the light shielding layer to be received by the pixel 51L, a light component at a left side as seen from the subject of the photographing lens 1 which is provided in the upper portion of the sheet of FIG. 2, that is, a light component entering from a direction in which the subject is seen with a right eye becomes a main component and among light components which pass through the aperture "c" of the light shielding layer to be received by the pixel 51R, a light component at a right side as seen from the subject of the photographing lens 1, that is, a light component entering from a direction in which the subject is watched with a left eye becomes a main component.

That is, a captured image signal which is obtained by seeing the subject with the left eye is obtained by all the phase difference detecting pixels 51R and a captured image signal which is obtained by seeing the subject with the right eye is obtained by all the phase difference detecting pixels 51L. Therefore, both captured image signals are combined to perform correlated operation, thereby obtaining phase difference information.

In the meantime, in the phase difference detecting pixel 51R and the phase difference detecting pixel 51L, apertures of the light shielding layers are reversely off-centered to obtain phase difference information. However, a structure for obtaining the phase difference information is not limited thereto, but other well-known structures may be employed. For example, a common oval micro lens (top lens) may be mounted in the pair pixel.

The defocus amount calculating unit 18 illustrated in FIG. 1 uses an output signal group read out from the phase difference detecting pixel 51L and the phase difference detecting pixel 51R to calculate a phase difference amount which is a relative off-centered amount of two images formed by the pair of luminous fluxes. Further, the defocus amount calculating unit 19 calculates a focus adjusted state of the photographing lens 1, in this case, an amount by which the photographing lens 1 deviates from a focused state and a direction thereof, that is, a defocus amount, as a distance measurement result, based on the phase difference amount.

The defocus amount calculating unit 18 divides, for example, the light receiving surface of the solid-state imaging element 5 into nine (3×3) AF regions and calculates the defocus amount using an output signal group read out from the phase difference detecting pixel 51L and the phase difference detecting pixel 51R in one AF region which is selected by manipulation of a user nine AF regions.

The digital camera illustrated in FIG. 1 may set a continuous AF mode which continuously focuses on a major subject while capturing a moving image. The continuous AF mode is, for example, set in a period when an operation capturing is performed by the solid-state imaging element 5 to display a live view image or a period when a shutter included in the manipulating unit 14 is pressed to issue a moving image recording command during the moving image photographing mode.

When the mode is set to the continuous AF mode, the defocus amount calculating unit 18 calculates a defocus amount using an output signal obtained from the phase difference detecting pixel 51L and the phase difference detecting pixel 51R by the capturing whenever the capturing is performed by the solid-state imaging element 5 and stores the calculated defocus amount in the main memory 16.

When the mode is set to the continuous AF mode, the defocus amount difference calculating unit 19 illustrated in FIG. 1 calculates a difference between a defocus amount obtained by arbitrary imaging and a defocus amount obtained by imaging which is continuously performed on the arbitrary imaging, among the obtained defocus amounts, with respect to at least three imaging which are continuously performed by the solid-state imaging element 5.

For example, when the mode is set to the continuous AF mode, a defocus amount D1 obtained by first imaging, a defocus amount D2 obtained by second imaging, and a defocus amount D3 obtained by third imaging are sequentially stored in the main memory 16. The defocus amount difference calculating unit 19 calculates $\Delta S1=D2-D1$ and $\Delta S2=D3-D2$ and stores $\Delta S1$ and $\Delta S2$ in the main memory 16. Further, $\Delta S1=D1-D2$ and $\Delta S2=D2-D3$ may be allowed.

The system control unit 11 calculates a variance of a plurality of difference data (for example, $\Delta S1$ and $\Delta S2$) stored in the main memory 16 and controls to move the focus lens to a focus position by performing the phase difference AF when the calculated variance is smaller than a threshold value. Further, when the calculated variance is equal to or larger than the threshold value, the system control unit 11 controls to fix the position of the focus lens without performing the phase difference AF.

Next, an operation of the digital camera configured as described above in the continuous AF mode will be described.

Figure 3:
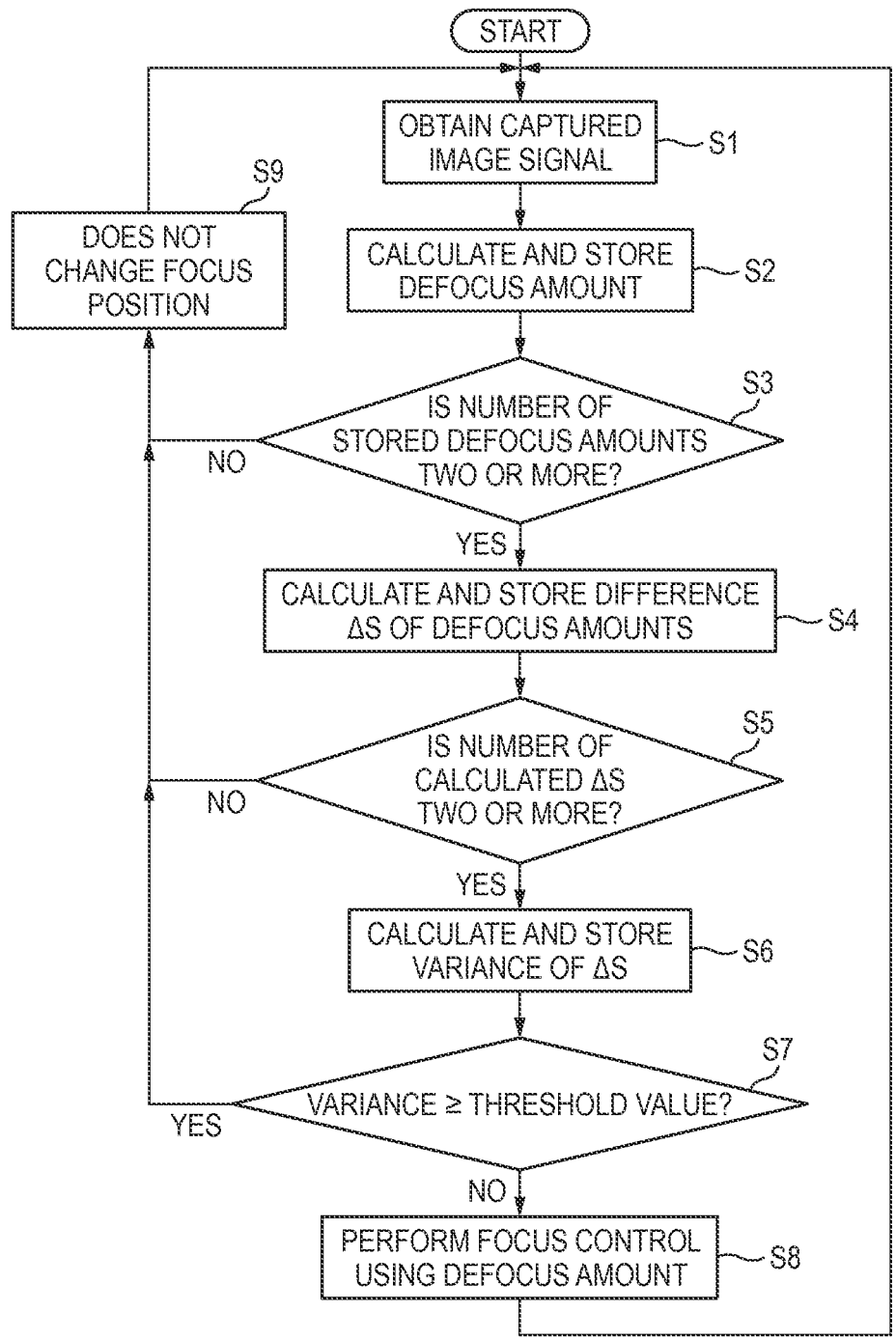
FIG. 3 is a flowchart illustrating a processing order of a focusing method according to an embodiment of the present invention.

FIG. 3 is a flowchart for explaining an operation in a continuous AF mode of the digital camera illustrated in FIG. 1.

When the continuous AF mode is set, the defocus amount calculating unit 18 receives a captured image signal output from the solid-state imaging element 5 (step S1). The defocus amount calculating unit 18 calculates a defocus amount (a distance measurement result) using the captured image signal and stores the calculated defocus amount in the main memory 16 (step S2).

Next, the system control unit 11 determines whether the number of defocus amounts stored in the main memory 16 is equal to or larger than 2. When the number of defocus amounts is smaller than 2 (NO in step S3), the system control unit 11 does not change the position of the focus lens (step S9). Further, when next imaging is performed by the solid-state imaging element 5, the processing in step S1 is performed again.

In the embodiment, at most four defocus amounts may be stored in the main memory 16 at most and when four defocus amounts have been already stored, the latest defocus amount is overwritten on the oldest defocus amount to be stored.

When the determination in step S3 is YES, the defocus amount difference calculating unit 19 calculates a difference $\Delta S$ of the latest defocus amount and a next new defocus amount among the defocus amounts stored in the main memory 16 and stores the difference $\Delta S$ in the main memory 16 (step S4).

In the main memory 16, the difference $\Delta S$, for example, at most three differences $\Delta S$ are stored and when three $\Delta S$ have been already stored, the latest one is overwritten on the oldest one to be stored.

Next, the system control unit 11 determines whether the number of $\Delta S$ stored in the main memory 16 is equal to or larger than 2. When the number of $\Delta S$ is smaller than 2 (NO in step S5), the system control unit 11 does not change the position of the focus lens (step S9). Further, when next imaging is performed by the solid-state imaging element 5, the processing in step S1 is performed again.

When the determination in step S5 is YES, the system control unit 11 calculates a variance of the plurality of $\Delta S$ stored in the main memory 16 (step S6) and does not change the position of the focus lens when the calculated variance is equal to or larger than the threshold value (YES in step S7). In the meantime, when the calculated variance is smaller than the threshold value (NO in step S7), in step S8, the system control unit 11 performs the focus control by the phase difference AF to move the focus lens to the focus position using the defocus amount.

Figure 4:
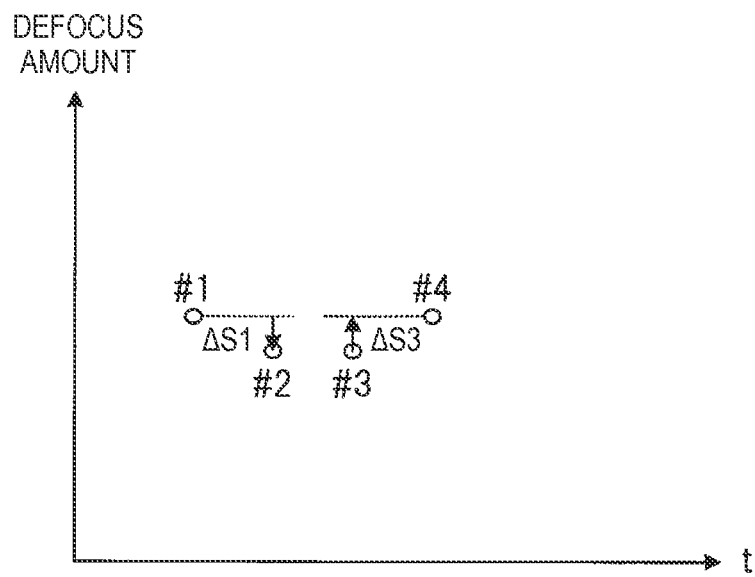
FIG. 4 is a graph explaining a focusing method based on a specific example of distance measurement position data.
Figure 5:
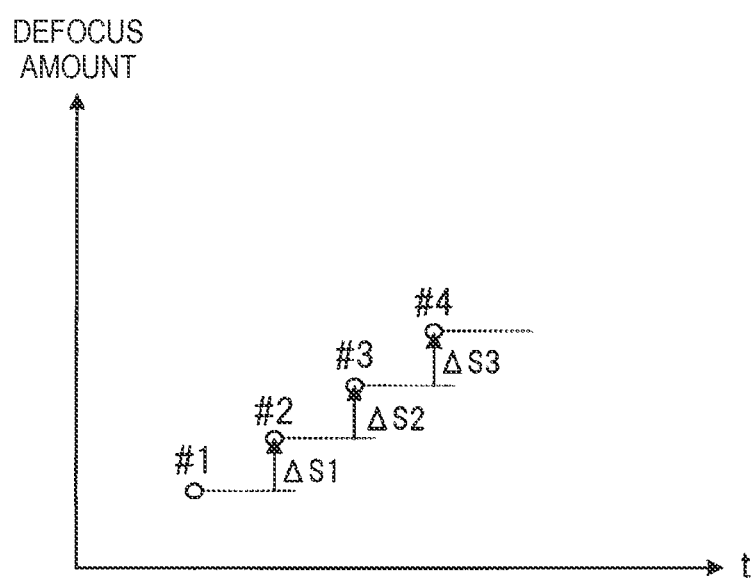
FIG. 5 is a graph explaining a focusing method based on another specific example of distance measurement position data.
Figure 6:
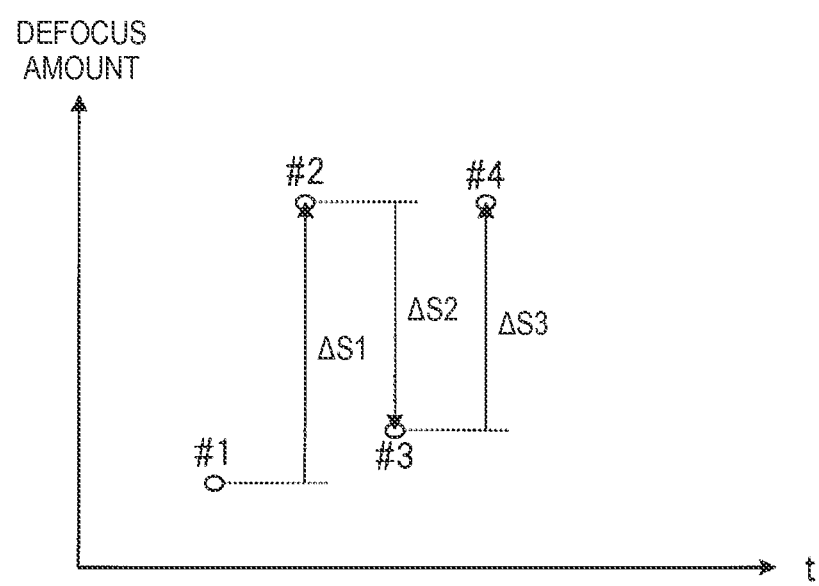
FIG. 6 is a graph explaining a focusing method based on another specific example of distance measurement position data.

FIGS. 4 to 6 are views explaining specific examples of differences of defocus amounts obtained in step S4 of FIG. 3 and a variance of the difference. FIGS. 4 to 6 are graphs representing a defocus amount obtained from an output signal of the phase difference detecting pixel among frame data of a moving image along a time axis t.

A graph of FIG. 4 represents a state when there are little differences between defocus amounts #1, #2, #3, and #4 in the order of frames. In this case, $\Delta S1=\#2-\#1$, $\Delta S2=\#3-\#2$, and $\Delta S3=\#4-\#3$ are close values and a variance of $\Delta S$ is decreased. In this case, it may be determined that the major subject to be focused is an almost stationary object and does not move. Therefore, in this case, in step S8, the focus lens moves to a focus position based on the defocus amount #4, so that imaging in which the major subject is focused may be performed in next imaging.

In the graph of FIG. 5, the defocus amounts #1, #2, #3, and #4 are monotonically increased whenever a time t elapses. In this case, $\Delta S1=\#2-\#1$, $\Delta S2=\#3-\#2$, and $\Delta S3=\#4-\#3$ are almost the same value and thus the variance of $\Delta S$ is decreased. In this case, it may be determined that the major subject moves at a constant speed. Therefore, in step S8, the focus lens moves to a focus position based on the defocus amount #4, so that imaging in which the major subject is focused may be performed in next imaging.

In the meantime, as illustrated in FIG. 5, when all $\Delta S$ have positive values (or negative values) and variances of $\Delta S$ are smaller than the threshold value, it may be determined that the major subject moves at a constant speed. Therefore, in step S8, the system control unit 11 calculates an average of ΔS1, ΔS2, and ΔS3 (corresponding to a movement amount of the major subject) and moves the focus lens by using a value obtained by adding the average to a defocus amount #4 as a defocus amount. By doing this, in next capturing, the focus may be formed on a point to which the major subject moves.

In a graph of FIG. 6, the defocus amount fluctuates by being increased or decreased as the time elapses. In this case, ΔS1=#2−#1 has a positive value, ΔS2=#3−#2 has a negative value, and ΔS3=#4−#3 has a positive value so that the variance of ΔS is increased.

In this state, when the focus lens performs the focusing operation, the focus lens position may be highly likely to fluctuate and it is difficult to actually focus on the subject. Therefore, in the state as illustrated in FIG. 6, in step S9, the position of the focus lens does not change.

The threshold value used for determination in step S7 depends on a chip area of the solid-state imaging element 5, an interval (period) at which the phase difference detecting pixels are provided, and a lens performance, so that the threshold value may be experimentally determined for every design specification of the individual cameras (imaging devices).

As described above, according to the digital camera of the embodiment, it is determined whether to perform the phase difference AF depending on the value of the variance of the difference of the defocus amounts, so that even when the major subject which moves at a constant speed is photographed, the situation is determined to perform appropriate AF processing. Even though it is difficult to distinguish the case of FIG. 5 from the case of FIG. 6 by simply calculating the variance of the defocus amount, the case of FIG. 5 is distinguished from the case of FIG. 6 by calculating the variance of the difference between the defocus amounts, thereby performing appropriate AF processing.

In order to calculate the variance of ΔS, a plurality of ΔS is required and in order to calculate the plurality of ΔS, imaging for obtaining the defocus amount needs to be performed at least three times. Therefore, it is difficult to determine whether to continuously perform or stop the focusing operation until three times of capturing is performed after setting the mode to the continuous AF mode.

In the digital camera of the embodiment, in the case of NO in step S3 and NO in step S5 of FIG. 3, the focus lens does not move. Therefore, the change of the captured image is suppressed in the period when it is difficult to determine whether to continuously perform or stop the focusing operation, thereby preventing a photographer from feeling an uncomfortable feeling.

In the meantime, until the variance of Δ can be calculated after setting to the continuous AF mode, that is, until the determination in step S5 of FIG. 3 becomes YES, an optimal defocus amount may be calculated at that time using the defocus amount which is obtained by that time and the focus lens may move based on the calculated defocus amount.

For example, when the number of ΔS required to calculate the variance is four, after the first imaging after setting to the continuous AF mode, the focus lens moves based on the defocus amount obtained by imaging.

Next, after the second imaging, the focus lens moves based on an average of the defocus amount obtained by the first imaging and the defocus amount obtained by the second imaging.

Next, after third imaging, the focus lens moves based on an average of the defocus amount obtained by the first imaging, the defocus amount obtained by the second imaging, and a defocus amount obtained by third imaging or a median value when three defocus amounts are presented in the order of higher values.

Next, after fourth imaging, the focus lens moves based on an average of the defocus amount obtained by the first imaging, the defocus amount obtained by the second imaging, the defocus amount obtained the third imaging, and a defocus amount obtained by fourth imaging or an average of two defocus amounts excluding a maximum value and a minimum value from the four defocus amounts.

When fifth imaging is performed, since the number of ΔS is four, it is determined whether to perform the focus control in accordance with the variance of ΔS.

In the above-described embodiment, even though it is determined whether to continue the focusing operation in accordance with the variance of the difference of the defocus amounts, numerical information from which the variance is calculated is not limited to the defocus amount but any value corresponding to the defocus amount may be available. For example, a phase difference amount obtained by performing a correlated operation of an output signal of the phase difference detecting pixel 51R and an output signal of the phase difference detecting pixel 51L may be used.

In the above-described embodiment, even though the description has been made using the solid-state imaging element 5 of FIG. 2 as an example, the present invention is not limited thereto and may be applied to a case when the pixels are arranged in a square lattice pattern. Further, even though the pair pixel of the phase difference detecting pixel is a G filter mounted pixel, also when a R filter mounted pixel is a phase difference detecting pixel or a B filter mounted pixel is a phase difference detecting pixel, the above-described embodiment may be applied.

In the above-described embodiment, even though the phase difference detecting pixel pair is formed by the closest pixels having the same color, the pixels do not need to be the closest, for example, the phase difference detecting pixel pair may be a pair of proximate pixels which are spaced apart from each other by one pixel or two pixels therebetween.

The above-described embodiment, as illustrated in FIG. 2, is configured such that the phase difference detecting pixels are simultaneously formed on the light receiving surface of the imaging element and phase difference data is simultaneously read out from the phase difference detecting pixels by the imaging by the imaging element. However, the present invention is not limited to the above configuration, but may be applied to a configuration in which phase difference detecting elements which form the phase difference detecting pixel are provided separately from the imaging element and incident light from a photographing lens is divided by two so that one of the incident light is received by the imaging element and the other one is received by the phase difference detecting element.

The processing illustrated in FIG. 3 may be provided as a program which may be executed by a computer. The program is recorded in a non-transitory recording medium in which the program may be read out by the computer. The "computer readable recording medium" includes an optical medium such as a compact disc-ROM (CD-ROM) or a magnetic recording medium such as a memory card. Further, the program may be provided by being downloaded through a network.

As described above, as the embodiments of the imaging device of the present invention, the digital camera has been described, but the configuration of the imaging device is not limited thereto. As other imaging devices of the present invention, an embedded or external camera for a PC, or a portable terminal device which has a photographing function which will be described below may be exemplified.

Examples of a portable terminal device which is an embodiment of the imaging device of the present invention may include a portable phone, a smart phone, a personal digital assistants (FDA), or a portable gaming device. Hereinafter, as an example, the smart phone will be described in detail with reference to the drawings.

Figure 7:
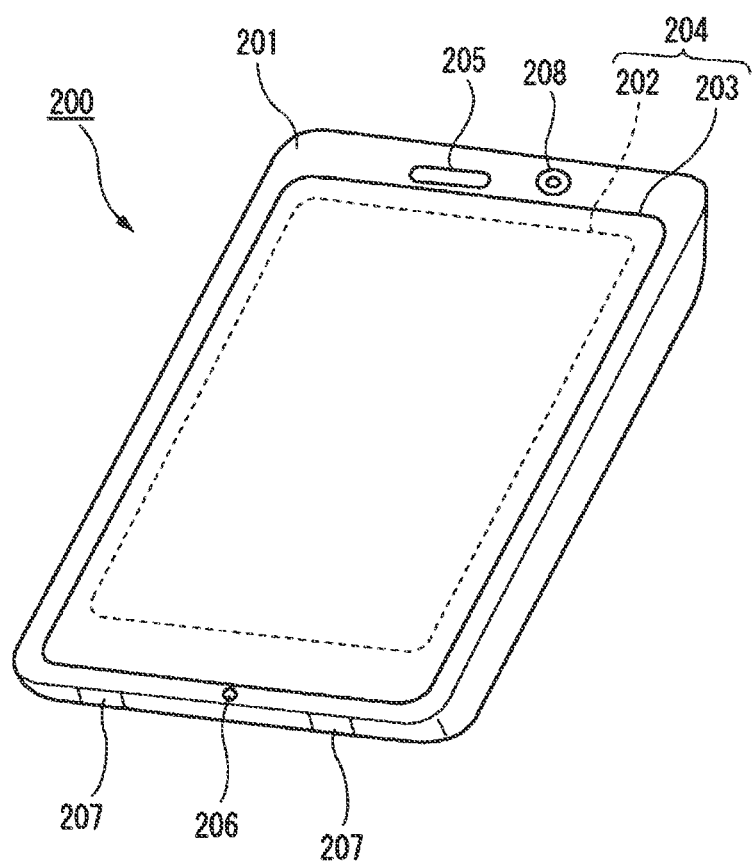
FIG. 7 is a view of an exterior of a smart phone which is an example of an imaging device of the present invention.

FIG. 7 illustrates an outer appearance of a smart phone 200 which is an embodiment of an imaging device of the present invention. The smart phone 200 illustrated in FIG. 7 includes a flat panel type housing 201 and is provided, on one surface of the housing 201, with a display input unit 204 in which a display panel 202 as a display unit and an operating panel 203 as an input unit are integrated. In addition, the housing 201 includes a speaker 205, a microphone 206, an operating unit 207, and a camera 208. However, a configuration of the housing 201 is not limited thereto. For example, a configuration in which the display unit and the input unit are independent from each other may be employed or a configuration having a folding structure or a slide mechanism may be employed.

Figure 8:
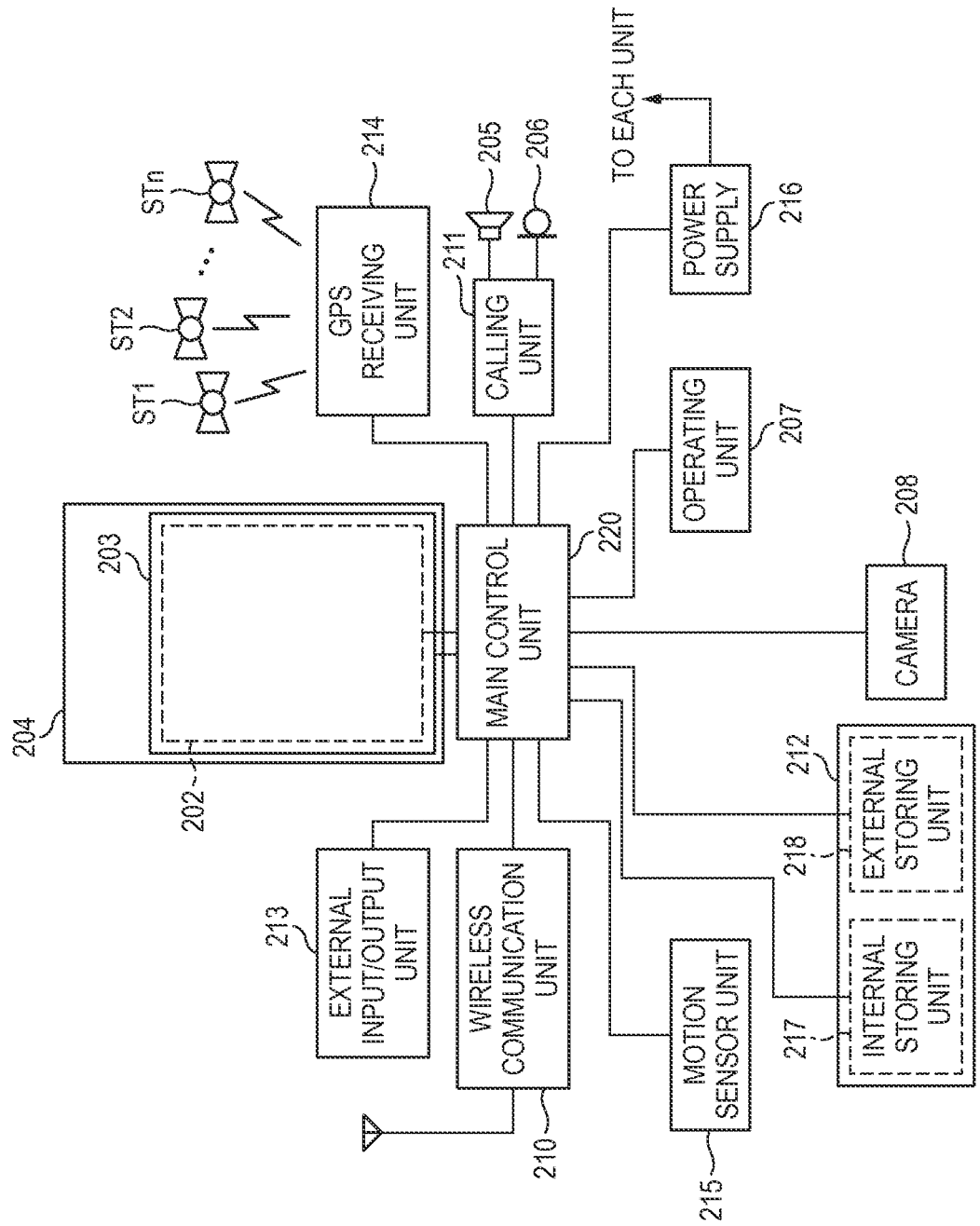
FIG. 8 is a functional block diagram of the smart phone illustrated in FIG. 7.

FIG. 8 is a block diagram illustrating a configuration of the smart phone 200 illustrated in FIG. 7. As illustrated in FIG. 8, as main components, the smart phone includes a wireless communication unit 210, a display input unit 204, a calling unit 211, an operating unit 207, a camera 208, a storing unit 212, an external input/output unit 213, a global positioning system (GPS) receiving unit 214, a motion sensor unit 215, a power supply 216, and a main control unit 220. Further, as a main function of the smart phone 200, the smart phone 200 is provided with a wireless communication function which performs mobile wireless communication through a base station device BS which is not illustrated and a mobile communication network NW which is not illustrated.

The wireless communication unit 210 performs wireless communication with a base station device BS which is accommodated in a mobile communication network NW in accordance with an instruction of the main control unit 220. Using the wireless communication, the wireless communication unit 210 transmits/receives various file data such as voice data and image data and electronic mail data or receives web data, streaming data, or the like.

The display input unit 204 is provided with a display panel 202 and an operating panel 203 as a so-called touch panel which displays an image (a still image or a moving image) or text information under the control of the main control unit 220 so as to visually transmit information to a user, and detects the user's operation on displayed information.

The display panel 202 uses a liquid crystal display (LCD), an organic electro-luminescence display (OELD), or the like, as a display device.

The operating panel 203 is a device which is disposed to allow an image displayed on a display surface of the display panel 202 to be visually recognized and detects one or a plurality of coordinates which can be operated by a finger of the user or a stylus. When the device is operated by the finger of the user or the stylus, a detection signal which is generated based on the operation is output to the main control unit 220. Subsequently, the main control unit 220 detects an operating position (coordinate) on the display panel 202, based on the received detection signal.

As illustrated in FIG. 7, the display panel 202 and the operating panel 203 of the smart phone 200 exemplified as an embodiment of the imaging device of the present invention are integrated with each other to constitute the display input unit 204, in which the operating panel 203 may be disposed to completely cover the display panel 202.

When such an arrangement is employed, the operating panel 203 may be provided with a function of detecting the user's operation on a region other than the display panel 202. In other words, the operating panel 203 may include a detection region (hereinafter, referred to as a "display region") on an overlapping portion which overlaps the display panel 202 and a detection region (hereinafter, referred to as a "non-display region") for the other outer peripheral portion which does not overlap the display panel 202.

In the meantime, the size of the display region and the size of the display panel 202 may completely coincide with each other, but both sizes do not necessarily coincide with each other. In addition, the operating panel 203 may include two sensitive regions of an outer peripheral portion and an inner portion other than the outer peripheral portion. Moreover, a width of the outer peripheral portion is appropriately designed in accordance with the size of the housing 201. Moreover, as a position detecting system employed in the operating panel 203, a matrix switch system, a resistive layer system, a surface elastic wave system, an infrared system, an electromagnetic induction system, or an electrostatic capacitive system may be exemplified, and any system may be employed.

The calling unit 211 includes the speaker 205 or the microphone 206 and converts the user's voice input through the microphone 206 into voice data to be processed by the main control unit 220 and outputs the converted voice data to the main control unit 220, or decodes voice data received by the wireless communication unit 210 or the external input/output unit 213 and outputs the decoded voice data from the speaker 205. Furthermore, as illustrated in FIG. 7, for example, the speaker 205 may be mounted on the same surface as the surface provided with the display input unit 204 and the microphone 206 may be mounted on a side surface of the housing 201.

The operating unit 207 is a hardware key which uses a key switch and receives an instruction from the user. For example, as illustrated in FIG. 7, the operating unit 207 is a push button type switch which is mounted on a side surface of the housing 201 of the smart phone 200 and turned on when the operating unit 207 is pressed by a finger and turned off by restoring force of a spring when the finger is removed.

The storing unit 212 stores a control program or control data of the main control unit 220, application software, address data to which names, phone numbers, or the like of communication counterparts are correlated, transmitted/received electronic mail data, web data downloaded by web browsing or downloaded content data, and temporarily stores streaming data. Further, the storing unit 212 is configured by an internal storing unit 217 which is mounted in the smart phone and an external storing unit 218 which includes a detachable external memory slot. Furthermore, the internal storing unit 217 and the external storing unit 218 which configure the storing unit 212 are implemented by using a storing medium such as a flash memory type, hard disk type, multimedia card micro type, or card type memory (for example, MicroSD (registered trademark) memory), a random access memory (RAM), or a read only memory (ROM).

The external input/output unit 213 functions as an interface with all external devices which are connected to the smart phone 200 and is configured to be directly or indirectly connected to any other external devices by communication (for example, universal serial bus (USB) or IEEE1394) or a network (for example, Internet, wireless LAN, Bluetooth (registered trademark), a radio frequency identification (RFID), an infrared data association (IrDA (registered trademark)), ultra wideband (UWB (registered trademark)), or a zigbee (registered trademark).

As external devices connected to the smart phone 200, a wired/wireless head set, a wired/wireless external charger, a wired/wireless data port, a memory card or a SIM (subscriber identity module) card/UIM (user identity module) card connected through a card socket, an external audio/video device connected through an audio/video input/output (I/O) terminal, a wirelessly connected external audio/video device, a wiredly/wirelessly connected smart phone, a wiredly/wirelessly connected personal computer, a wiredly/wirelessly connected PDA, a wiredly/wirelessly connected personal computer, or an earphone may be exemplified. The external input/output unit 213 may transmit data which is received from such external devices to individual components in the smart phone 200 and may also allow the data in the smart phone 200 to be transmitted to an external device.

The GPS receiving unit 214 receives GPS signals which are transmitted from GPS satellites ST1 to STn according to an instruction from the main control unit 220 and performs a position measurement operation processing based on the received GPS signals to detect a position formed of a latitude, a longitude, and a height of the smart phone 200. When the GPS receiving unit 214 may obtain positional information from the wireless communication unit 210 or the external input/output unit 213 (for example, the wireless LAN), the GPS receiving unit 214 may detect a position using that positional information.

The motion sensor unit 215 includes, for example, a three axis acceleration sensor and detects a physical movement of the smart phone 200 according to the instruction of the main control unit 220. When the physical movement of the smart phone 200 is detected, the movement direction or acceleration of the smart phone 200 is detected. The detected result is output to the main control unit 220.

The power supply 216 supplies power which is accumulated in a battery (not illustrated) to individual units of the smart phone 200 according to the instruction of the main control unit 220.

The main control unit 220 includes a microprocessor and operates according to a control program or control data stored in the storing unit 212 and collectively controls individual units of the smart phone 200. Further, the main control unit 220 is provided with a mobile communication control function and an application processing function to control individual units of a communication system in order to perform voice communication or data communication through the wireless communication unit 210.

The application processing function is implemented when the main control unit 220 is operated according to the application software which is stored in the storing unit 212. The application processing function includes, for example, an infrared communication function which performs data communication with a counterpart device by controlling the external input/output unit 213, an electronic mail function which transmits/receives an electronic mail, and a web browsing function which browses a web page.

The main control unit 220 is provided with an image processing function which displays an image on the display input unit 204 based on the image data (still image or moving image data) such as received data or downloaded streaming data. The image processing function refers to a function of decoding the image data and performing image processings on the decoded result to display the image on the display input unit 204 by the main control unit 220.

The main control unit 220 executes a display control of the display panel 202 and an operation detection control which detects a user's operation through the operating unit 207 and the operating panel 203. By executing the display control, the main control unit 220 displays an icon to activate application software or a software key such as a scroll bar or displays a window for preparing an electronic mail. Here, the scroll bar refers to a software key for receiving an instruction to move a displayed portion of an image with respect to a large image which is not covered by the display region of the display panel 202.

When the operation detection control is executed, the main control unit 220 detects the user's operation through the operating unit 207 or receives an operation on the icon or the input of a character string of an input section of the window through the operating panel 203 or receives a scroll request of a displayed image through the scroll bar.

By executing the operation detection control, the main control unit 220 determines whether the operating position of the operating panel 203 is an overlapping portion (display region) which overlaps the display panel 202 or an outer peripheral portion (non-display region) which does not overlap the display panel 202 other than the overlapping portion, and is provided with a touch panel control function that controls a sensitive region of the operating panel 203 or a display position of the software key.

The main control unit 220 may detect a gesture operation with respect to the operating panel 203 and execute a predetermined function according to the detected gesture operation. The gesture operation refers to an operation which draws a trace using a finger, designates a plurality of positions simultaneously, or a combination thereof to draw a trace for at least one of the plurality of positions, rather than a simple touch operation of the related art.

The camera 208 has a phase difference AF function and includes a configuration other than the external memory control unit 20, the recording medium 21, the display control unit 22, the display unit 23, and the operating unit 14 in the digital camera which is illustrated in FIG. 1. Captured image data which is generated by the camera 208 may be stored in the storing unit 212 or output through the input/output unit 213 or the wireless communication unit 210. As illustrated in FIG. 9, although the camera 208 is mounted on the same surface as the display input unit 204 in the smart phone 200, the mounting position of the camera 208 is not limited thereto and the camera 208 may be mounted on a rear surface of the display input unit 204.

The camera 208 may be used for various functions of the smart phone 200. For example, an image which is obtained by the camera 208 may be displayed on the display panel 202, or the image of the camera 208 may be used as one of operation inputs of the operating panel 203. Further, when the GPS receiving unit 214 detects the position, the position may be detected with reference to the image from the camera 208. Moreover, an optical axis direction of the camera 208 of the smart phone 200 may be determined or a current usage environment may also be determined with reference to the image from the camera 208 either without using the 3-axis acceleration sensor or using the 3-axis acceleration sensor. Of course, the image from the camera 208 can be used in the application software.

Positional information obtained by the GPS receiving unit 214, voice information obtained by the microphone 206 (which may be text information obtained by performing a voice-text conversion by the main control unit or the like), or posture information obtained by the motion sensor unit 215 may be added to the image data of a still image or a moving image to be stored in the storing unit 212 or output through the input/output unit 213 or the wireless communication unit 210.

In the smart phone 200 with the above configuration, the camera 208 performs the processing illustrated in FIG. 3 using the solid-state imaging element 5 which has been described with reference to FIG. 2 as the imaging element of the camera 208, thereby achieving high precision phase difference AF.

As described above, the specification discloses the following matters.

It is disclosed an imaging device, comprising: an imaging element which images a subject by an imaging optical system including a focus lens, wherein the imaging element includes a plurality of imaging pixels and a plurality of phase difference detecting pixels which receives luminous fluxes which have passed through different parts of a pupil area of the imaging optical system; a calculating unit which calculates numerical information corresponding to a defocus amount using an image signal obtained by imaging by the plurality of phase difference detecting pixels whenever the imaging is performed by the imaging element; a difference calculating unit which calculates with respect to at least three times of imaging which is continuously performed, a difference between the numerical information obtained by arbitrary imaging of the at least three times of imaging and the numerical information obtained by the imaging which is continuously performed after the arbitrary imaging; and a control unit which moves the focus lens to a focus position using the numerical information obtained by the calculating unit when a variance of the plurality of differences obtained by the difference calculating unit is smaller than a threshold value and controls a position of the focus lens not to be changed when the variance is equal to or larger than the threshold value.

In the imaging device, when the variance of the plurality of differences obtained by the difference calculating unit is smaller than the threshold value and all signs of the plurality of differences are the same, the control unit moves the focus lens to the focus position based on the numerical information calculated for the last imaging of the at least three times of imaging and the plurality of differences.

In the imaging device, after being set to a mode in which the focus control of the focus lens is continuously performed, the control unit does not change the position of the focus lens until the at least three times of imaging is performed.

In the imaging device, after being set to a mode in which the focus control of the focus lens is continuously performed, the control unit controls the position of the focus lens based on the numerical information obtained by imaging performed after being set to the mode until the at least three times of imaging is performed.

It is disclosed a focus control method of an imaging device including an imaging element which images a subject by an imaging optical system including a focus lens, wherein the imaging element includes a plurality of imaging pixels and a plurality of phase difference detecting pixels which receives luminous fluxes which have passed through different parts of a pupil area of the imaging optical system, and the method comprises: a calculating step which calculates numerical information corresponding to a defocus amount using an image signal obtained by imaging by the plurality of phase difference detecting pixels whenever the imaging is performed by the imaging element; a difference calculating step which calculates with respect to at least three times of imaging which is continuously performed, a difference between the numerical information obtained by arbitrary imaging of the at least three times of imaging and the numerical information obtained by the imaging which is performed after the arbitrary imaging; and a control step which moves the focus lens to a focus position using the numerical information obtained in the calculating step when a variance of the plurality of differences obtained in the difference calculating step is smaller than a threshold value and controls a position of the focus lens not to be changed when the variance is equal to or larger than the threshold value.

It is discloses a non-transitory computer readable medium storing a program causing a computer to execute a process for controlling a focus of a focus lens of an imaging device including an imaging element which images a subject by an imaging optical system including the focus lens, wherein the imaging element includes an imaging pixel and a plurality of phase difference detecting pixels which receives luminous fluxes which have passed through different parts of a pupil area of the imaging optical system, and the process comprises: a calculating step which calculates numerical information corresponding to a defocus amount using an image signal obtained by imaging by the plurality of phase difference detecting pixels whenever the imaging is performed by the imaging element; a difference calculating step which calculates with respect to at least three times of imaging which is continuously performed, a difference between the numerical information obtained by arbitrary imaging of the at least three times of imaging and the numerical information obtained by the imaging which is performed after the arbitrary imaging; and a control step which moves the focus lens to a focus position using the numerical information obtained in the calculating step when a variance of the plurality of differences obtained in the difference calculating step is smaller than a threshold value and controls a position of the focus lens not to be changed when the variance is equal to or larger than the threshold value.

According to the above-described embodiment, since it is determined whether to continue or stop the focusing operation by a variance of difference data between frames of a distance measurement distance to the subject, it is possible to appropriately and precisely make a decision. Therefore, a possibility of imaging a significantly defocused image is reduced.

The imaging device according to the present invention may appropriately determine whether to continue or stop a focus following operation when the continuous AF is performed by the phase difference AF method, so that the imaging device may be advantageously applied to a camera which photographs a moving body.

Although the present invention has been described above by the specific embodiment, the present invention is not limited to the embodiment but various modifications may be allowed without departing from a technical spirit of the disclosed invention.

What is claimed is:

1. An imaging device, comprising:
    an imaging element which images a subject by an imaging optical system including a focus lens, wherein the imaging element includes a plurality of imaging pixels and a plurality of phase difference detecting pixels which receives luminous fluxes which have passed through different parts of a pupil area of the imaging optical system; and at least one processor configured to function as:
a calculating unit which calculates numerical information corresponding to a defocus amount using an image signal obtained by imaging by the plurality of phase difference detecting pixels whenever the imaging is performed by the imaging element;
a difference calculating unit which calculates with respect to at least three times of imaging which is continuously performed, a difference between the numerical information obtained by arbitrary imaging of the at least three times of imaging and the numerical information obtained by the imaging which is continuously performed after the arbitrary imaging; and
a control unit which moves the focus lens to a focus position using the numerical information obtained by the calculating unit when a variance of the plurality of differences obtained by the difference calculating unit is smaller than a threshold value and controls a position of the focus lens not to be changed when the variance is equal to or larger than the threshold value.

2. The imaging device of claim 1, wherein when the variance of the plurality of differences obtained by the difference calculating unit is smaller than the threshold value and all signs of the plurality of differences are the same, the control unit moves the focus lens to the focus position based on the numerical information calculated for the last imaging of the at least three times of imaging and the plurality of differences.

3. The imaging device of claim 1, wherein after being set to a mode in which the focus control of the focus lens is continuously performed, the control unit does not change the position of the focus lens until the at least three times of imaging is performed.

4. The imaging device of claim 1, wherein after being set to a mode in which the focus control of the focus lens is continuously performed, the control unit controls the position of the focus lens based on the numerical information obtained by imaging performed after being set to the mode until the at least three times of imaging is performed.

5. A focus control method of an imaging device including an imaging element which images a subject by an imaging optical system including a focus lens,
wherein the imaging element includes a plurality of imaging pixels and a plurality of phase difference detecting pixels which receives luminous fluxes which have passed through different parts of a pupil area of the imaging optical system, and
the method comprises:
a calculating step which calculates numerical information corresponding to a defocus amount using an image signal obtained by imaging by the plurality of phase difference detecting pixels whenever the imaging is performed by the imaging element;
a difference calculating step which calculates with respect to at least three times of imaging which is continuously performed, a difference between the numerical information obtained by arbitrary imaging of the at least three times of imaging and the numerical information obtained by the imaging which is performed after the arbitrary imaging; and
a control step which moves the focus lens to a focus position using the numerical information obtained in the calculating step when a variance of the plurality of differences obtained in the difference calculating step is smaller than a threshold value and controls a position of the focus lens not to be changed when the variance is equal to or larger than the threshold value.

6. A non-transitory computer readable medium storing a program causing a computer to execute a process for controlling a focus of a focus lens of an imaging device including an imaging element which images a subject by an imaging optical system including the focus lens,
wherein the imaging element includes an imaging pixel and a plurality of phase difference detecting pixels which receives luminous fluxes which have passed through different parts of a pupil area of the imaging optical system, and
the process comprises:
a calculating step which calculates numerical information corresponding to a defocus amount using an image signal obtained by imaging by the plurality of phase difference detecting pixels whenever the imaging is performed by the imaging element;
a difference calculating step which calculates with respect to at least three times of imaging which is continuously performed, a difference between the numerical information obtained by arbitrary imaging of the at least three times of imaging and the numerical information obtained by the imaging which is performed after the arbitrary imaging; and
a control step which moves the focus lens to a focus position using the numerical information obtained in the calculating step when a variance of the plurality of differences obtained in the difference calculating step is smaller than a threshold value and controls a position of the focus lens not to be changed when the variance is equal to or larger than the threshold value.

* * * * *